United States Patent [19]

Dollinger et al.

[11] Patent Number: 5,248,470
[45] Date of Patent: Sep. 28, 1993

[54] PROCESS OF BIAXIALLY ORIENTING COEXTRUDED BARRIER FILMS OF POLYVINYLIDENE CHLORIDE AND AN ALKYL ACRYLATE

[75] Inventors: Susan E. Dollinger, Granville; Robert A. Luecke, Newark; James E. Holton, Newark, all of Ohio

[73] Assignee: The Dow Chemical Company, Midland, Mich.

[21] Appl. No.: 889,886

[22] Filed: May 29, 1992

Related U.S. Application Data

[62] Division of Ser. No. 491,412, Mar. 9, 1990, Pat. No. 5,164,268.

[51] Int. Cl.$^5$ ............................................. B29C 55/12
[52] U.S. Cl. .................................. 264/171; 264/210.7; 264/290.2; 264/235.8; 264/237
[58] Field of Search ............... 264/171, 173, 288.8, 264/290.2, 210.7, 512, 514, 235.8, 237

[56] References Cited

U.S. PATENT DOCUMENTS

| | | |
|---|---|---|
| 2,779,684 | 1/1957 | Alles . |
| 3,275,716 | 9/1966 | Wiggins . |
| 3,448,183 | 6/1969 | Chisholm . |
| 3,524,795 | 8/1970 | Peterson . |
| 3,579,416 | 5/1971 | Schrenk . |
| 3,707,590 | 12/1972 | Wiggins et al. ............ 264/514 |
| 4,096,946 | 6/1978 | Cook et al. . |
| 4,472,330 | 9/1984 | Ashcraft . |
| 4,525,414 | 6/1985 | Ohya et al. ............ 428/213 |
| 4,561,920 | 12/1985 | Foster . |
| 4,694,068 | 9/1987 | DeLassus et al. . |
| 4,714,638 | 12/1987 | Lustig et al. . |
| 4,894,107 | 1/1990 | Tsu et al. ............ 264/171 |
| 4,923,650 | 5/1990 | Antoon et al. ............ 264/290.2 |
| 5,108,844 | 4/1992 | Blemberg et al. ............ 264/171 |
| 5,147,594 | 9/1992 | Moffitt ............ 264/514 |

FOREIGN PATENT DOCUMENTS

120719 6/1986 Japan .

Primary Examiner—Jeffery Thurlow

[57] ABSTRACT

Disclosed is a process for preparing a biaxially oriented substantially non-shrinkable film comprising coextruding a multilayered film comprising a first and second outer layers of resinous thermoplastic material and a barrier layer of a resinous copolymer of vinylidene chloride and an alkyl acrylate, and biaxially draw-tentering the film at a temperature within about 10° C. of the melting point of the copolymer and less than the melting point of the thermoplastic materials of the outer layers.

10 Claims, 3 Drawing Sheets

PROCESS OF BIAXIALLY ORIENTING COEXTRUDED BARRIER FILMS OF POLYVINYLIDENE CHLORIDE AND AN ALKYL ACRYLATE

CROSS REFERENCE TO RELATED APPLICATION

This is a division of application Ser. No. 491,412 filed Mar. 9, 1990, now U.S. Pat. No. 5,164,268.

BACKGROUND OF THE INVENTION

This invention relates to a biaxially oriented, coextruded barrier film comprising polyolefin skin or outer layers, a core barrier layer of vinylidene chloride-acrylate copolymer, and adhesive layers therebetween.

Numerous coextruded cast barrier films are known in the art such as Saranex ® (trademark of The Dow Chemical Company). Other barrier films are seen in U.S. Pat. Nos. 4,561,920, 3,524,795, 3,579,416, and 4,714,638. A typical barrier film comprises one or more barrier layers of a gas or liquid impermeable thermoplastic material, and one or more layers of a water and/or water vapor impermeable second thermoplastic material. Thermoplastics useful in barrier layers include polyvinylidene chloride and copolymers thereof.

Desired is a coextruded barrier film providing improved strength and durability, increased modulus, non-extensibility, improved optical clarity, and improved barrier properties. Such improvements in films in general have been effected by uniaxially or biaxially orienting the barrier film. Biaxial orientation of a film may be carried out simultaneously or sequentially. In simultaneous orientation, the film is stretched in two dimensions at the same time. The film may also be oriented simultaneously by stretching in both dimensions but at unequal rates of stretching. Simultaneous biaxial stretching may be effected in a conventional blown film process or in a tentering process. In sequential orientation, the film is stretched in two steps or completely in one dimension and then completely in the other dimension, and is usually accomplished in a tentering apparatus. Sequential orientation may also be carried out alternately by stretching in one dimension, stretching in the other dimension, and then again in the original dimension in an iterative manner for any number of cycles. The extent of sequential stretching in the two dimensions may be equal or unequal.

Previous attempts at biaxially orienting coextruded cast barrier films utilizing polyvinylidene chloride or copolymers of polyvinylidene chloride and polyvinyl chloride in the barrier layer have been unsuccessful because such orientation deleteriously affected the barrier properties of film. Biaxial orientation, particularly two-step or sequential biaxial orientation, can deleteriously affect the barrier properties of the film by altering the crystalline structure of the polymer or copolymer comprising the barrier layer resulting in microvoids therein. Microvoids in the barrier layer substantially increase the degree of oxygen permeability, an undesirable property in most applications utilizing barrier films.

Two-step, sequential biaxial orientation exacerbates the formation of microvoids in a multilayer coextruded barrier film more than simultaneous biaxial orientation because the crystalline structure of the barrier layer is altered twice instead of once.

In commercial and industrial applications, biaxial orientation of films is usually accomplished by sequential stretching in an on-line tentering apparatus. Simultaneous biaxial orientation, though useful in imparting as desirable if not more desirable characteristics to films than sequential biaxial orientation, is not as mechanically adaptable to industrial processes as sequential orientation. Since sequential biaxial orientation is prevalent in industrial processes for making oriented film, a particularly desirable oriented, coextruded barrier film would substantially maintain barrier properties upon sequential orientation.

The creation of microvoids can be avoided or substantially reduced by orienting the multilayer coextruded cast barrier film at a temperature as close as possible to the melting point of the crystalline or semi-crystalline polymer or copolymer comprising the barrier layer. Orientation of the cast coextruded film at such a temperature ensures that the degree of crystallinity of the polymer or copolymer comprising the barrier layer will be minimal, and, thus, that void formation will be minimized.

Orienting a coextruded, cast barrier film at temperature as close as possible to that of the melting point of the polymer or copolymer comprising the barrier layer is difficult because the melting point of most conventional thermoplastic materials which comprise barrier layers is usually greater than the melting point of the thermoplastic materials which conventionally comprise outer or skin layers. The temperature at which the orientation occurs must be lower than the melting point of the outer layers of the film because the tentering apparatus which imparts the desired orientation to the film physically contacts and interfaces with the film at the outer layers. Processing conditions at this interface usually dictate that orientation be carried out at a temperature 10°–30° C. below the melting point of the thermoplastic materials comprising the outer layers. If the temperature of orientation is substantially below the melting point of thermoplastic materials comprising the barrier layer, significant formation of microvoids may result due to a substantial degree of crystallization in the barrier layer at that temperature.

Accordingly, there exists a need for an improved coextruded barrier film which retains a substantial degree of oxygen impermeability upon biaxial orientation. There exists a further need for a coextruded barrier film which retains a substantial degree of oxygen impermeability upon sequential biaxial orientation. There exists a further need for a coextruded barrier film utilizing a barrier layer of polyvinylidene chloride or copolymers thereof which retains a substantial degree of oxygen impermeability upon sequential biaxial orientation.

BRIEF DESCRIPTION OF THE DRAWING

The novel features of the present invention and the context within which they are set will be better understood upon reviewing the following specification together with the drawing.

SUMMARY OF THE INVENTION

A coextruded, sequentially biaxially oriented barrier film according to the present invention comprises first and second outer layers of thermoplastic materials and an intermediate barrier layer of a copolymer of vinylidene chloride and an alkyl acrylate. The copolymer has a melting point about equal to or less than the melting point of each of the thermoplastic materials of the outer layers. The film further has an oxygen permeability of less than 0.25 cc-mil/100 sq. in.-atm-day at 23° C. based upon the thickness of the barrier layer of the acrylate-vinylidene chloride copolymer. The preferred alkyl acrylate is methyl acrylate.

A simultaneously biaxially oriented coextruded barrier film according to the present invention comprises first and second outer layers of thermoplastic materials and a barrier layer of a copolymer of vinylidene chloride and an alkyl acrylate. The film has an oxygen permeability of less than 0.13 cc-mil/100 sq. in.-atm-day at 23° C. based upon the thickness of the barrier layer of acrylate-vinylidene chloride copolymer. The preferred alkyl acrylate is methyl acrylate.

A preferred biaxially oriented coextruded barrier film is substantially nonshrinkable and comprises a first outer layer of a thermoplastic material, a second outer layer of a thermoplastic material, and a barrier layer of a copolymer of vinylidene chloride and methyl acrylate wherein the copolymer is from about more than 6 to about 10 percent by weight methyl acrylate.

A process for preparing the sequentially or a simultaneously biaxially oriented barrier film according to the present invention comprises coextruding a first and second outer layers of resinous thermoplastic materials and an intermediate barrier layer of a resinous copolymer of vinylidene chloride and an alkyl acrylate to form a composite cast film, decreasing the temperature of the composite cast film below the melting point of the thermoplastic materials of the outer layers, optionally adjusting the temperature of the composite cast film to within about 10° C. of the melting point of the copolymer and less than the melting point of the thermoplastic materials of the outer layers, and biaxially orienting the composite cast film. Preferably, the copolymer of the barrier layer has a melting point about equal to or less than the melting point of the thermoplastic materials comprising each of the outer layers.

DETAILED DESCRIPTION

Figure 3:
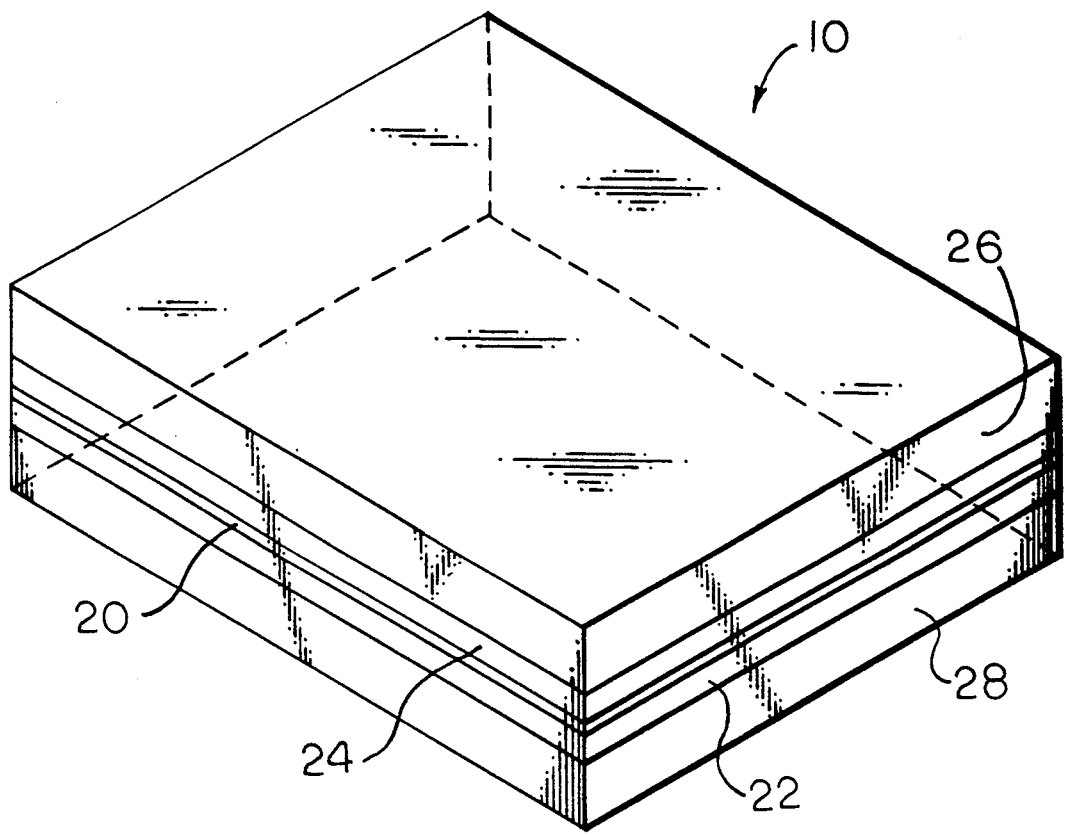
FIG. 3 is a greatly enlarged isometric view of a biaxially oriented, coextruded barrier film of the present invention.

A biaxially oriented, coextruded barrier film according to the present invention is referenced generally by the numeral 10, and is illustrated in FIG. 3. Film 10 comprises outer layers 26 and 28 and an intermediate barrier layer 20. Preferably, the film 10 further comprises adhesive layers 22 and 24 situated between outer layers 26 and 28 and barrier layer 20.

Outer layers 26 and 28 are comprised of a thermoplastic material such as a polyolefin, a polyester, a polyamide, or a polyvinyl aromatic. Each of outer layers 26 and 28 may comprise the same or a different thermoplastic material. A preferred thermoplastic material comprising outer layers 26 and 28 is a polyolefin. Suitable polyolefins include polyethylene, polypropylene, copolymers of ethylene and propylene, or blends of polyethylene and polypropylene. Suitable polyethylenes include low density polyethylene, linear low density polyethylene, and ultra low linear density polyethylene. The most preferred polyolefin for use in outer layers 26 and 28 is polypropylene.

Adhesive layers 22 and 24 increase the degree of adhesion between barrier layer 20 and outer layers 26 and 28. The resins of polymers or polymeric compositions suitable for use in adhesive layers are well known in the art, and include ethylene-vinyl acetate copolymers and various alkyl acrylate polymers such as ethyl acrylate and isobutylacrylate. The preferred material for adhesive layers 22 and 24 is an ethylene-vinyl acetate copolymer having about from 10 weight percent to about 40 weight percent vinyl acetate. The most preferred material for adhesive layers 22 and 24 is an ethylene-vinyl acetate copolymer having about from 20 weight percent to about 30 weight percent vinyl acetate.

Barrier layer 20 preferably comprises a copolymer of vinylidene chloride and an alkyl acrylate or alkyl alkacrylate such as methyl acrylate, ethyl acrylate, butylacrylate, or methyl methacrylate. The most preferred alkyl acrylate is methyl acrylate. A preferred barrier layer forming composition for integration into a sequentially biaxially oriented film comprises a copolymer of vinylidene chloride and methyl acrylate wherein methyl acrylate is present at more than 6 percent to about 10 percent by weight. A preferred barrier layer forming composition for integration into a simultaneously biaxially oriented film comprises a copolymer of vinylidene chloride and methyl acrylate wherein methyl acrylate is present from about 6 percent to about 10 percent by weight. Copolymers of vinylidene chloride and methyl acrylate exhibit a lower degree of crystallinity at ambient temperature than vinylidene chloride homopolymers and copolymers of vinylidene chloride and vinyl chloride. This lower degree of crystallinity allows for improved orientation behavior, and results in a film having better barrier characteristics. A more preferred barrier layer forming composition comprises a vinylidene chloride-methyl acrylate copolymer wherein the methyl acrylate is present in from about 7.5 percent to about 8.7 percent by weight. A most preferred barrier layer forming composition comprises a copolymer of vinylidene chloride and methyl acrylate wherein the methyl acrylate is present in about 7.5 percent by weight.

Copolymers of vinylidene chloride and alkyl acrylates, particularly methyl acrylate, exhibit several desirable properties which make them suitable for incorporation in barrier layer 20 and superior to homopolymers of vinylidene chloride and polyvinylidene chloride copolymers. These properties include lower crystalline melting points, lower rates of crystallization, and lower equilibrium levels of crystallinity.

Copolymers of vinylidene chloride and alkyl acrylates, particularly methyl acrylate at acrylate proportions of about 5 percent or more by weight, have lower melting points than homopolymers of vinylidene chloride or copolymers of vinylidene chloride and vinyl chloride of equivalent molecular weight. The crystalline melting point of a copolymer of vinylidene chloride and alkyl acrylates decreases as the proportion of acrylate in the copolymer increases. In copolymer molecular weight ranges commonly utilized in film applications, a methyl acrylate proportion of more than about 6 weight percent may result in a barrier layer copolymer having a melting point below that of many thermoplastic materials which commonly comprise outer layers, including polypropylenes and copolymers of ethylene and propylene wherein propylene is the major component. If the barrier layer copolymer has a melting point lower than that of the polymer comprising the outer layers and about the same as the desired orientation temperature of said polymer, then the cast film may be tentered at or about the melting point of the copolymer. Tentering or orienting at or close to the melting point of the barrier layer copolymer ensures that crystallinity will be minimal or nonexistent. The lower the degree of crystallinity of the barrier layer copolymer upon orientation, the lower the incidence of void formation, and, thus, the lower the gas permeability.

Copolymers of vinylidene chloride and methyl acrylate further have lower rates of crystallization and lower equilibrium levels of crystallinity than copolymers of vinylidene chloride and vinyl chloride. These lower rates and equilibrium levels also result in improved orientability behavior, which results in lower gas permeability of the oriented film.

Film 10 is prepared according to the present invention by coextruding a plurality of resinous thermoplastic materials to form a composite cast film of first and second outer layers, an intermediate barrier layer, and adhesive layers therebetween at a temperature at or above the melting point of each of the resinous thermoplastic materials of the layers, decreasing the temperature of the outer layers of the composite cast film below the melting point of their thermoplastic materials, optionally adjusting the temperature of the composite cast film to within about 10° C. of the melting point of the copolymer of the barrier layer and less than the melting point of the thermoplastic material or materials comprising each of the outer layers and, and biaxially stretching the composite cast film either simultaneously or sequentially in two steps. The biaxially oriented film is then further processed as desired or cooled to ensure the physical integrity of the barrier layer.

Decreasing of the temperature of the outer layers below their melting point after coextrusion is a necessary process step in a casting process because the cast composite film is in a molten or semi-molten state upon exiting the coextruder. Decreasing of the temperature of the outer layers to a submolten level such as by quenching by a chill roll ensures the handleabilty and physical integrity of the outer layers of the composite cast film as they subsequently contact various mechanical surfaces such as those of a tentering apparatus. Preferably, the temperature of the entire composite cast film is decreased below the melting point of the thermoplastic materials of the outer layers and the barrier layers after coextrusion. More preferably, the temperature of the entire cast film including the barrier layer is decreased below the melting point of all thermoplastic materials comprising the film. Most preferably, the temperature of the entire composite cast film is decreased to an ambient level after coextrusion. Reduction of the temperature of the barrier layer after coextrusion is necessary to minimize crystallinity development within the barrier copolymer. The temperature of the composite cast film is then adjusted (increased if composite cast film is at ambient temperature) to the desired orientation temperature but below the melting point of the outer layers of the composite cast film.

If one outer layer is composed of a different thermoplastic material comprising the other outer layer, the temperature of the outer layers must be decreased after coextrusion to below the melting point of the thermoplastic material having the lower melting point of the two to facilitate subsequent handling of the film.

Biaxial orientation of the cast composite film forming oriented film 10 may be carried out simultaneously or sequentially. A typical cast composite film may be stretched from about one to fifty times its original dimensions. More typically, cast composite films will be stretched from about two to twenty times its original dimensions. Most typically, a cast composite film will be stretched from about three to about ten times its original dimensions.

As film resin extrudate exits the die in a blown or casting film process, a minor degree of uniaxial orientation is imparted to the extrudate. This impartation is negligible in view of the much more substantial biaxial orientation which occurs in the tentering apparatus or the bubble.

Preferably, films according to the present invention will be substantially nonshrinkable. A film is substantially nonshrinkable when about 10 percent or less shrinkage occurs when the the oriented film is immersed in boiling water. Nonshrinkability may be imparted to the oriented film by heat setting of the film.

The lower the degree of crystallinity of the barrier layer at the time and temperature the film is oriented, the lower the incidence of the formation of microvoids. The lower the incidence of microvoids in the oriented film, the lower the degree of oxygen permeability. It is further desirable to conduct such orientation at or above the glass transition temperature of the thermoplastic materials comprising the outer layers.

The temperature at which the orientation of the cast composite film forming oriented film 10 is carried out is determined by the characteristics of the thermoplastic materials comprising both the barrier and outer layers.

For thermoplastic outer layers 26 and 28, the temperature of orientation is preferably between their glass transition temperatures and their melting points to ensure the impartation of the desired orientation to the crystalline or semi-crystalline structure of the material. For most thermoplastic materials commonly comprising the outer layers such as the polyolefins, the desirable orientation temperature ranges from about 10° to about 30° C. below the melting point of the material. For polypropylene, the most preferred orientation temperature is about 20° C. below its melting point, and for low linear density polyethylene, the most preferred orientation temperature is about 10° C. below.

For barrier layer 20, the temperature of orientation is preferably higher than the glass transition temperature of and within about 10° C. above or below the melting point of the thermoplastic material comprising the same. Upon orientation of barrier layer 20 at such temperature, optimum barrier properties, most notably a substantial degree of oxygen impermeability, are maintained. Most preferably, the temperature of orientation is at about the melting point of the thermoplastic material comprising barrier layer 20.

Film 10 of the present invention is especially adapted to maintain a substantial degree of gas, including oxygen, impermeability after sequential or simultaneous biaxial tentering. A sequentially biaxially oriented film 10 will have an oxygen permeability of preferably less than 0.25, more preferably less than 0.13, and most preferably less than 0.09 cc-mil/100 sq.in./atm-day at 23° C. based upon the thickness of barrier layer 20. A simultaneously biaxially oriented film 10 will have an oxygen permeability of preferably less than 0.13, more preferably less than 0.09, and most preferably less than 0.06 cc-mil/100 sq.in./atm-day at 23° C. based upon the thickness of barrier layer 20.

A most preferred sequentially biaxially oriented film comprises outer layers of polypropylene, a barrier layer of a copolymer of vinylidene chloride methyl acrylate wherein the methyl acrylate comonomer is present at from more than 6 percent to about 10 percent by weight, and adhesive layers situated between the barrier layer and the outer layers. The adhesive layers preferably comprise an ethylene-vinyl acetate copolymer having a vinyl acetate content of between 20 and 30 percent by weight.

The examples below are provided for purposes of illustration, and are not to be construed as limiting. All percentages are by weight unless indicated otherwise. All oxygen permeabilities are based upon the thickness of the barrier layer.

EXAMPLES 1 AND 2

The oxygen permeabilities of both sequential and simultaneous biaxially oriented films and composite cast films of corresponding thicknesses were measured and compared for the two film types at various orientation temperatures.

A number of 5-layer composite cast films were coextruded with propylene-ethylene copolymer outer layers, ethylene-vinyl acetate copolymer (EVA) adhesive layers, and various SARAN ® (trademark of The Dow Chemical Co.) copolymers in the barrier core layers. Hercules 7531 propylene-ethylene copolymer was selected for the outer layers in order to allow orientation of the composite cast films over a wide temperature range. The barrier layer in each of the test films was about 12-13 percent of the entire film by volume, and each of the adhesive layers were about 10 percent each by volume. The thickness of both the composite cast test films and the oriented test films utilized in the Examples was about 2 mil.

The oriented films were formed by sequential and simultaneous tentering of 18 mil composite cast films. Tentering was carried out in a T. M. Long Stretching frame in a 3× stretch (three times the original dimensions) in two dimensions over a temperature range of 100° to 145° C. After the films were extruded, they were quenched and maintained at subambient temperatures (−8° C.) in order to minimize crystallinity development of the vinylidene chloride copolymers in the barrier layers. Minimization of crystallinity development is important for purposes of simulation of an on-line manufacturing process. In an on-line process, orientation of the film takes place immediately or soon after extrusion and forming of the film. For the oriented test films however, such orientation could not be effected immediately after extrusion because of processing equipment limitations; therefore, the degree of crystallinity of the freshly extruded composite cast film was maintained by freezing until such time as the films could be oriented.

The 2 mil composite cast films were coextruded and not subsequently oriented. They were of equivalent thickness to the 2 mil oriented films.

In Sample 1, the barrier layer composed SARAN XOS5253.34, B2000 low conversion (80/20 vinylidene chloride/vinyl chloride copolymer). In Sample 2, the barrier layer composed 6 percent MA SARAN XU32024.00 (94/6 vinylidene chloride/methyl acrylate copolymer). In Sample 3, the barrier layer composed 7.5 percent MA SARAN XU 32023.01 (92.5/7.5 vinylidene chloride/methyl acrylate copolymer). In Sample 4, the barrier layer composed 8.3 percent MA SARAN XU32025.01 (91.7/8.3 vinylidene chloride/methyl acrylate copolymer). In Sample 5, the barrier layer composed 8.7 percent MA SARAN XU 32028.01 (91.3/8.7 vinylidene chloride/methyl acrylate copolymer). All of the above percentages and proportions are directed to the balance of the composition of the barrier layers apart from the above mentioned extrusion aid.

The oxygen permeability of both the composite cast and the oriented films was measured on an Ox-Tran 1050 at 23° C. and the data summarized in Table 1. Although the oxygen permeability for the films as a whole was measured, the contribution of the outer layers to the permeability of the film was considered to be negligible.

Figure 1:
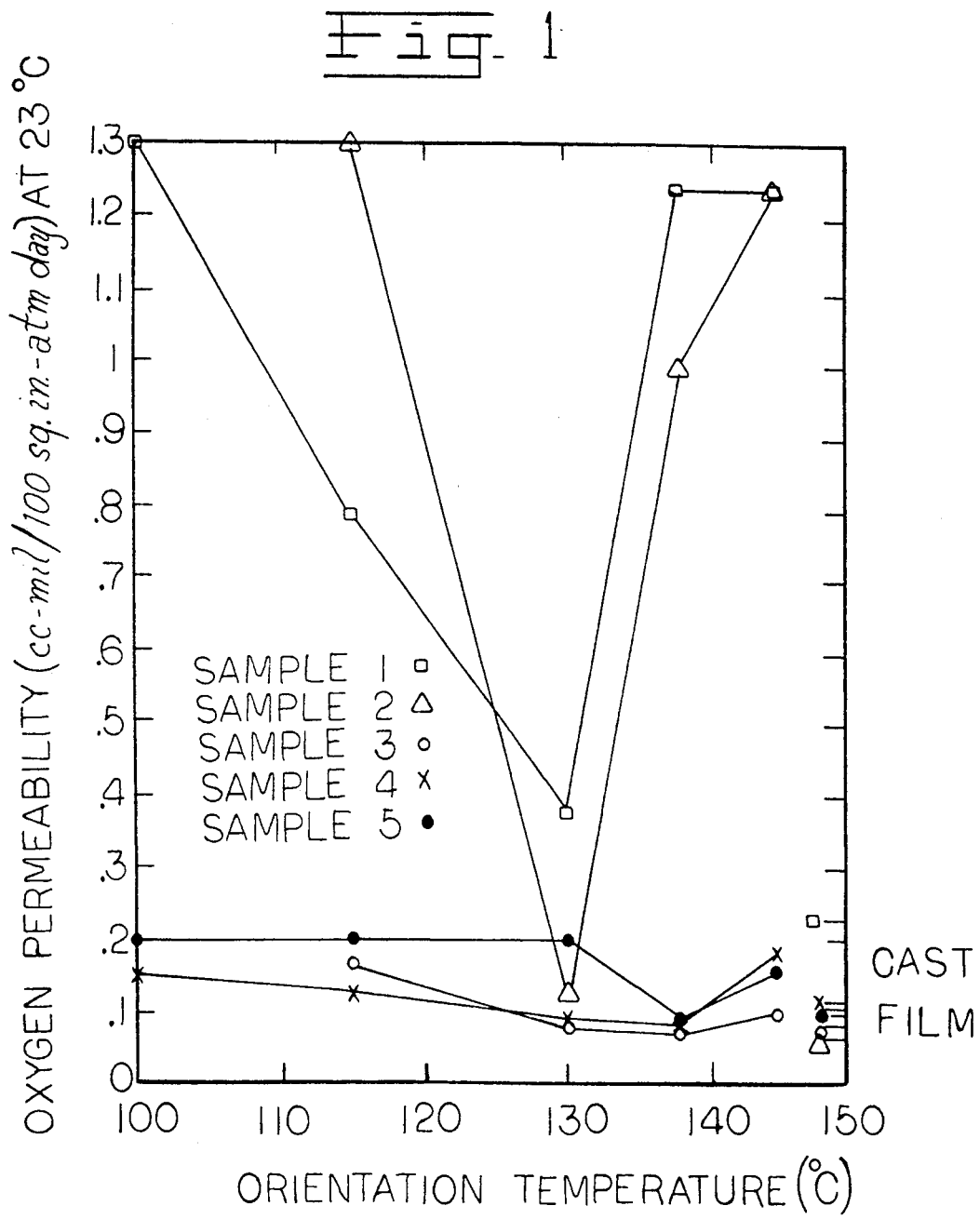
FIG. 1 is a graph showing the effect of sequential orientation upon the degree of oxygen permeability of different samples of films compared to the composite cast-film of the corresponding samples.
Figure 2:
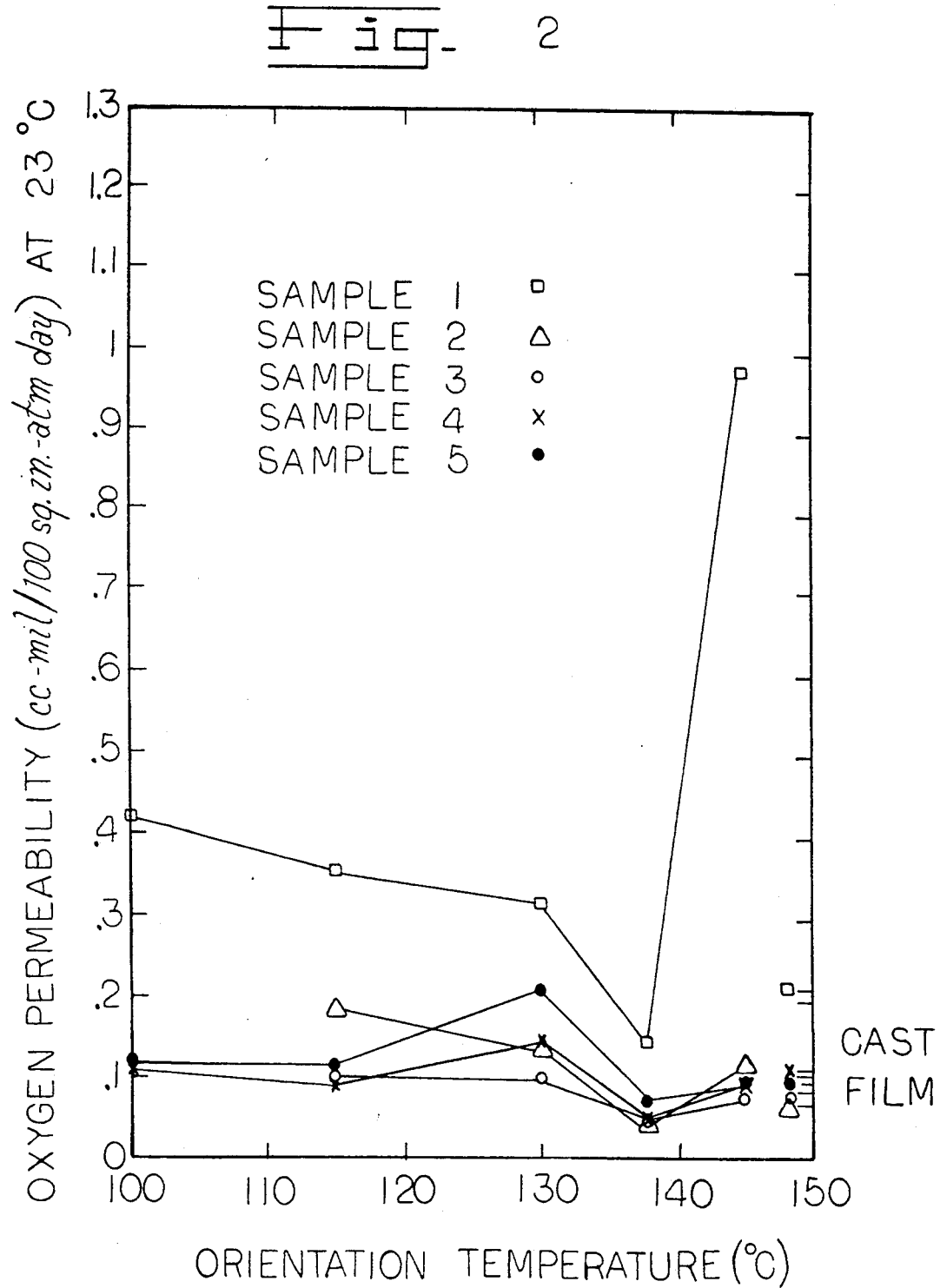
FIG. 2 is a graph showing the effect of simultaneous orientation upon the degree of oxygen permeability of different samples of films compared to the composite cast-film of the corresponding samples.

The data of Table 1 correspond to FIG. 1, and the data of Table 2 correspond to FIG. 2.

TABLE 1

| Sample No. | % Acrylate (by weight) | Oxygen Permeability 3 × 3 Sequential Biax | | | | | Cast Film |
|---|---|---|---|---|---|---|---|
| | | 100° C. | 115° C. | 130° C. | 138° C. | 145° C. | |
| 1 | 0 | >1.3 | 0.79 | 0.392 | 1.25 | 1.25 | 0.227 |
| 2 | 6 | — | ~1.3 | 0.132 | 1.0 | 1.25 | 0.082 |
| 3 | 7.5 | — | 0.165 | 0.089 | 0.072 | 0.096 | 0.091 |
| 4 | 8.3 | 0.155 | 0.131 | 0.10 | 0.076 | 0.184 | 0.107 |
| 5 | 8.7 | 0.199 | 0.205 | 0.211 | 0.085 | 0.156 | 0.106 |

(cc · mil/100 sq. in. atm. — day at 23° C. ± 1° C.)

In Table 1 and FIG. 1, the data of Sample 1 indicate the negative effect of sequential orientation upon the degree of oxygen permeability compared to the composite cast film of the same sample regardless of temperature of orientation. The data of Sample 2 indicate a similar negative effect upon oxygen permeability due possibly to lack of sufficient depression of the melting point of the copolymer comprising the barrier layer. The data of Samples 3-5 indicate an actual decrease in degree of oxygen permeability versus that of the cast film in the 130°-140° C. temperature range particularly around the 138° C. point.

TABLE 2

| Sample No. | % Acrylate (by weight) | Oxygen Permeability 3 × 3 Simultaneous Biax | | | | | Cast Film |
|---|---|---|---|---|---|---|---|
| | | 100° C. | 115° C. | 130° C. | 138° C. | 145° C. | |
| 1 | 0 | 0.421 | 0.356 | 0.323 | 0.149 | 0.979 | 0.228 |
| 2 | 6 | — | 0.192 | 0.145 | 0.050 | 0.12 | 0.082 |
| 3 | 7.5 | — | 0.107 | 0.11 | 0.049 | 0.084 | 0.091 |
| 4 | 8.3 | 0.11 | 0.099 | 0.148 | 0.056 | 0.095 | 0.107 |
| 5 | 8.7 | 0.12 | 0.12 | 0.208 | 0.076 | 0.099 | 0.106 |

In Table 2 and FIG. 2, the data of Sample 1 indicate the negative effect of simultaneous orientation upon the degree of oxygen permeability compared to the composite cast film of the same sample regardless of temperature of orientation. The data of Samples 2-5 indicate an actual decrease in degree of oxygen permeability versus that of the cast film in the 130°-140° C. temperature range particularly around the 138° C. level.

EXAMPLE 3

The oxygen permeability of a sequentially biaxially oriented coextruded barrier film having polypropylene outer layers was measured. The five layer structure is the same as the films found in Examples 1 and 2 except that it was 35 mils thick prior to orientation. The barrier layer comprised 8.25 percent MA SARAN XU 32022.00 (91.75/8.25 vinylidene chloride/methyl acrylate copolymer). The cast film was sequentially stretched 4.5 to 5.5 times in the machine direction and 7 to 9 times in the transverse direction at 145° C. The oxygen permeability was 0.13 ce-mil/100 sq. in.-atm-day at 23° C. based upon the thickness of the barrier layer.

EXAMPLE 4

The oxygen permeability of a sequentially biaxially oriented coextruded barrier film having outer layers of linear low density polyethylene was measured. The five layer structure is the same as the films found in Examples 1 and 2 except that it was 35 mils thick prior to orientation. The barrier layer comprised 8.25 percent MA SARAN XU 32022.00 (91.75/8.25 vinylidene chloride/methyl acrylate copolymer). The cast film was sequentially stretched 4.5 to 5.5 times in the machine direction and 7 to 9 times in the transverse direction at 110° C. The oxygen permeability was 0.22 cc-mil/100 sq. in.-atm-day at 23° C. based upon the thickness of the barrier layer.

While the preferred embodiments of the biaxially oriented coextruded film have been shown with regard to specific details, it will be appreciated that depending upon the manufacturing process and the manufacturer's desires, the present invention may be modified by various changes while still being fairly within the scope of the novel teachings and principles herein set forth.

What is claimed is:

1. A process for preparing a biaxially oriented substantially non shrinkable film, comprising:
    a) coextruding a first outer layer of a resinous thermoplastic material, a second outer layer of a resinous thermoplastic material, and a barrier layer of a resinous copolymer of vinylidene chloride and an alkyl acrylate to form a composite cast film, the copolymer having a melting point about equal to or less than the melting point of the thermoplastic materials comprising each of the outer layers;
    b) decreasing the temperature of the composite cast film below the melting point of the thermoplastic materials of the first and second outer layers;
    c) adjusting the temperature of the composite cast film to within about 10° C. of the melting point of the copolymer and less than the melting point of the thermoplastic materials of the outer layers; and
    d) biaxially draw-tentering the composite cast film; whereby a biaxially oriented film having an oxygen permeability of less than 0.25 cc-mil/100 sq. in.-atm-day at 23° C. based upon the thickness of the barrier layer, is obtained.

2. The process of claim 1, wherein the temperature of the composite cast film is decreased to an ambient temperature.

3. The process of claim 1, wherein the composite cast film is sequentially biaxially oriented.

4. The process of claim 3, wherein the draw-tenter temperature is in a range from 100° C. to 145° C.

5. The process of claim 3, wherein the draw-tenter temperature is in a range from 115° C. to 145° C.

6. The process of claim 3, wherein the draw-tenter temperature is in a range from 130° C. to 145° C.

7. The process of claim 1, wherein the composite cast film is simultaneously biaxially oriented, whereby a film having an oxygen permeability of less than 0.13 cc-mil/100 sq. in.-atm-day at 23° C. based upon the thickness of the barrier layer, is obtained.

8. The process of claim 7, wherein the draw-tenter temperature is in a range from 100° C. to 145° C.

9. The process of claim 7, wherein the draw-tenter temperature is in a range from 115° C. to 145° C.

10. The process of claim 7, wherein the draw-tenter temperature is in a range from 130° C. to 145° C.

* * * * *